United States Patent
Alperovich et al.

(10) Patent No.: US 6,298,247 B1
(45) Date of Patent: Oct. 2, 2001

(54) METHOD AND APPARATUS FOR AUTOMATIC VOLUME CONTROL

(75) Inventors: Vladimir Alperovich, Dallas; Eric Valentine; Walt Evanyk, both of Plano, all of TX (US)

(73) Assignee: Telefonaktiebolaget L.M. Ericsson (publ) (SE)

( * ) Notice: Subject to any disclaimer, the term of this patent is extended or adjusted under 35 U.S.C. 154(b) by 0 days.

(21) Appl. No.: 09/476,480

(22) Filed: Dec. 30, 1999

(51) Int. Cl.$^7$ .............................. H04B 1/38; H04M 1/00
(52) U.S. Cl. .............................. 455/558; 455/355
(58) Field of Search ........................ 455/355, 185.1, 455/186.1, 296, 312, 63, 570, 575, 558

(56) References Cited

U.S. PATENT DOCUMENTS

| | | | |
|---|---|---|---|
| 4,829,565 | 5/1989 | Goldberg | 379/390 |
| 4,924,193 | * 5/1990 | Saito et al. | 455/557 |
| 5,204,971 | * 4/1993 | Takahashi et al. | 455/185.1 |
| 5,485,515 | 1/1996 | Allen et al. | 379/391 |
| 5,732,390 | 3/1998 | Katayanagi et al. | 704/227 |
| 5,778,322 | * 7/1998 | Rydbeck | 455/558 |
| 5,790,671 | 8/1998 | Cooper | 381/57 |
| 5,966,438 | 10/1999 | Romesburg | 379/387 |

FOREIGN PATENT DOCUMENTS

| | | | |
|---|---|---|---|
| 0 661 860 A2 | 12/1993 | (EP) | H04M/9/08 |
| 0 836 310 A1 | 10/1996 | (EP) | H04M/1/60 |
| 2 237 463 A | 10/1989 | (GB) | H08G/3/32 |
| 2 308 932 A | 12/1995 | (GB) | H03G/3/32 |
| 6-291815 | 10/1994 | (JP) | H04M/1/00 |

\* cited by examiner

*Primary Examiner*—Nguyen T. Vo
(74) *Attorney, Agent, or Firm*—Gardere Wynne Sewell LLP; Sanford E. Warren, Jr.; Daniel J. Chalker

(57) ABSTRACT

An apparatus (100) is disclosed for automatically controlling the volume level of an audio signal transmitted to or received by a mobile station and/or terminal within a telecommunications network, the apparatus including a noise measuring device (102), a volume controller (104) communicably coupled to the noise measuring device, and a memory module (108) communicably coupled to the noise measuring device. In a wireless telecommunications network, the memory module may comprise a subscriber identity module (SIM) and contain preferred volume levels for given levels of noise for that particular subscriber. A method is also disclosed for automatically controlling the volume level of an audio signal transmitted to or received by a phone terminal and/or mobile station within a telecommunications network, comprising the steps of obtaining measurements of a background noise signal, obtaining a preferred volume level corresponding to the measurement of a background noise signal, and automatically adjusting the volume level of the audio signal to the preferred volume level.

19 Claims, 2 Drawing Sheets

METHOD AND APPARATUS FOR AUTOMATIC VOLUME CONTROL

TECHNICAL FIELD OF THE INVENTION

The present invention relates generally to telecommunications networks and in particular, to a method and apparatus for improving the intelligibility of phone transmissions by automatically controlling the volume.

BACKGROUND

The increasing demand for constant personal communication has resulted in the availability of phones in just about any location imaginable. Wireless or mobile phones have enabled individuals to communicate while roaming in a variety of dynamic environments, such as airplanes, cars, restaurants, and other public and private places. Furthermore, wireline phones, such as public pay phones, can be found in a variety of different environments, such as airports, train stations, stores, and gas stations, among others. These and other such environments are associated with considerable ambient or background noise which makes it difficult to clearly transmit and receive intelligible speech at an audible level.

As a result, the individuals on a phone conversation may often have to repeat themselves, which is inconvenient, time-consuming, inefficient and costly. Alternatively, they may shout or raise their voices to be heard over the noise, which compromises the privacy of the conversation. A person in a noisy environment may also increase the volume of the phone in order to better hear the person who is speaking on the other end.

Manually adjusting the volume level in response to loud background noise is tedious for both the individual at the speaking end and the individual at the listening end. In addition, increasing the volume level of a phone user's speech has the undesirable effect of increasing the volume of the background noise in the user's environment. Furthermore, manually increasing volume in response to background noise is undesirable since the volume must be later manually decreased to avoid acutely loud reception when the background noise dies down.

Indeed, within a given environment, the level of the background noise may fluctuate; for example, in a car, the background noise may vary depending on a number of external factors, such as the amount of traffic, the speed of the car, the output of the car stereo, the engine, the type of road, and other variable factors. In such an environment, manually adjusting the volume in response to each instance that the background noise increases or decreases is not only tedious but distracting as well and can endanger the safety of those in the vehicle as well as those in the vehicle's path.

SUMMARY OF THE INVENTION

From the foregoing, it can be appreciated that a need exists for an apparatus that allows for automatic control of the volume of a phone. It is believed that the apparatus and method of the present invention described herein solves and addresses the foregoing problems and limitations.

In accordance with the present invention, an apparatus is provided for automatically controlling the volume level of an audio signal transmitted to or received by a phone within a telecommunications network, the apparatus including a noise measuring device, a volume controller communicably coupled to the noise measuring device, and a memory module communicably coupled to the noise measuring device. In a wireless telecommunications network, the memory module may comprise a subscriber identity module (SIM) and may contain preferred volume levels for given levels of noise for that particular subscriber.

In accordance with another aspect of the present invention, a method is provided for automatically controlling the volume level of an audio signal transmitted to or received by a phone within a telecommunications network, comprising the steps of obtaining measurements of a background noise signal, obtaining a preferred volume level corresponding to the measurement of a background noise signal, and automatically adjusting the volume level of the audio signal to the preferred volume level.

DETAILED DESCRIPTION OF PREFERRED EMBODIMENTS

Figure 1:
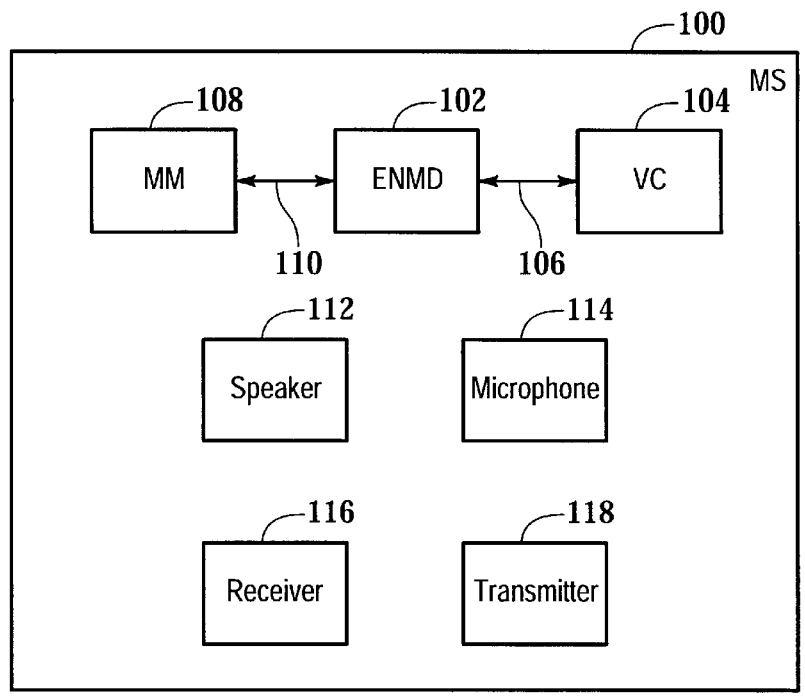
FIG. 1 depicts a block diagram of a mobile station in accordance with an embodiment of the present invention.

Reference is now made to FIG. 1, which first depicts a mobile station (MS) 100 which may represent a landline phone, portable station, a hand-held station, a hands-free station or a vehicle-installed station for use in a wireless telecommunications network for purposes of the following description. MS 100 may alternatively comprise a handset, hands-free speakerphone, or cordless phone for use in a conventional wireline telecommunications network.

MS 100 may include an External Noise Measuring Device (ENMD) 102 capable of receiving and measuring (e.g., in dB) external noise such as background noise. ENMD 102 may receive external noise from a separate microphone 114 associated with MS 100 or from a speaker 112 in MS 100, or from both. ENMD 102 may, for example, be located near a mouthpiece or an earpiece of MS 100, or both.

ENMD 102 may be communicably coupled to a volume control (VC) device 104 via an interface 106. VC 104 may comprise a circuit integrated in MS 100 capable of controlling the level of amplification of speaker 112 and a microphone 114 of MS 100.

ENMD 102 may also be communicably coupled to a memory module (MM) 108, such as a SIM or smart card, via an interface 110. MM 108 is a device within MS 100 for storing subscriber-related information, including the subscriber's volume control data, and associated software supporting the volume control application. Multiple SIM devices (not shown) that may store information relating to additional subscribers may be associated with MS 100.

Figure 2:
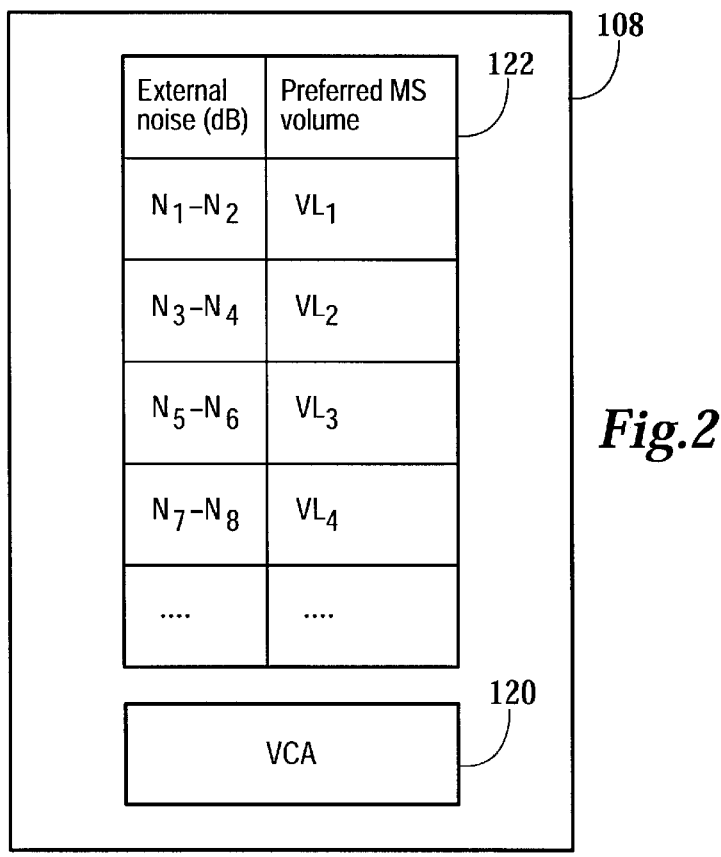
FIG. 2 depicts a block diagram of a subscriber identity module of the mobile station of FIG. 1.

Reference is now made to FIG. 2, in which a block diagram of MM 108 is depicted. MM 108 may comprise a volume control application (VCA) 120 and an associated subscriber database 122. Database 122 may comprise data which associates various ranges of external noise (e.g., in dB) with a particular volume level (VL) of MS 100.

In another embodiment of the present invention, an adaptive learning feature allows setting of the levels in database 122. When the subscriber makes a manual adjustment to the volume of MS 100, the external noise is measured. The external noise range is derived and entered into database 122 together with the level of the volume of MS 100. Database 122 may comprise data pertaining to the subscriber's preferred volume level for both receiving and transmitting signals.

Figure 3:
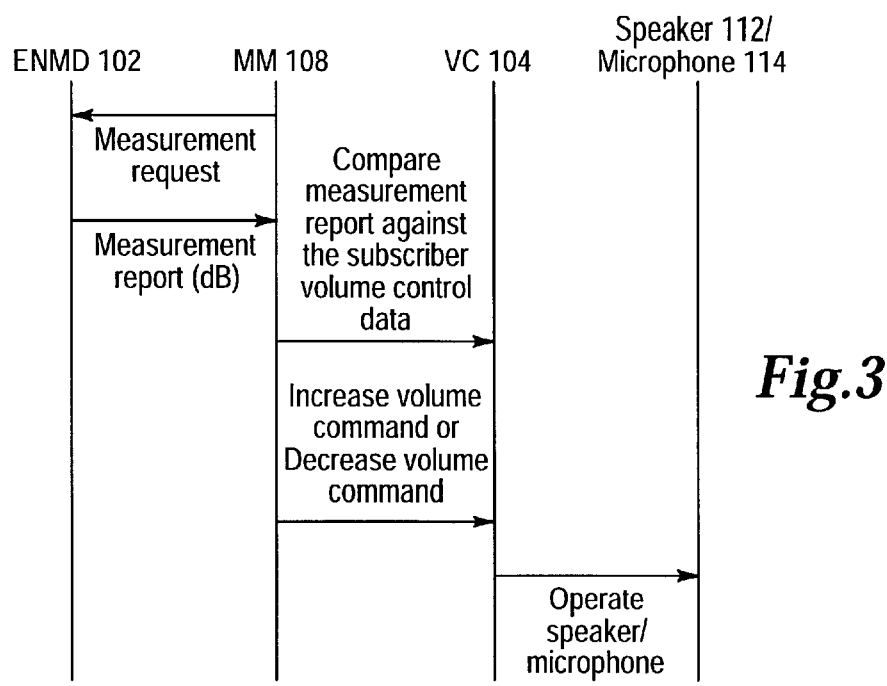
FIG. 3 depicts a flow diagram illustrating operation of the mobile station of FIG. 1.

Reference is now made to FIG. 3, which depicts a flow diagram illustrating operation of various components of MS 100. Application 120 within MM 108 may periodically request measurements of external noise data from ENMD 102 while MS 100 is in speech call. ENMD 102 will then provide the measurement report to application 120. Application 120 may then obtain the subscriber's desired volume control data from the database 122 in MM 108 and compare this to the external noise measurement data provided by ENMD 102. Based on this calculation, application 120 in MM 108 may send a control signal request to VC 104 to increase or decrease the volume of MS 100. VC 104 may then translate the request to a hardware operation to adjust the volume of speaker 112 or microphone 114 or both.

Figure 4:
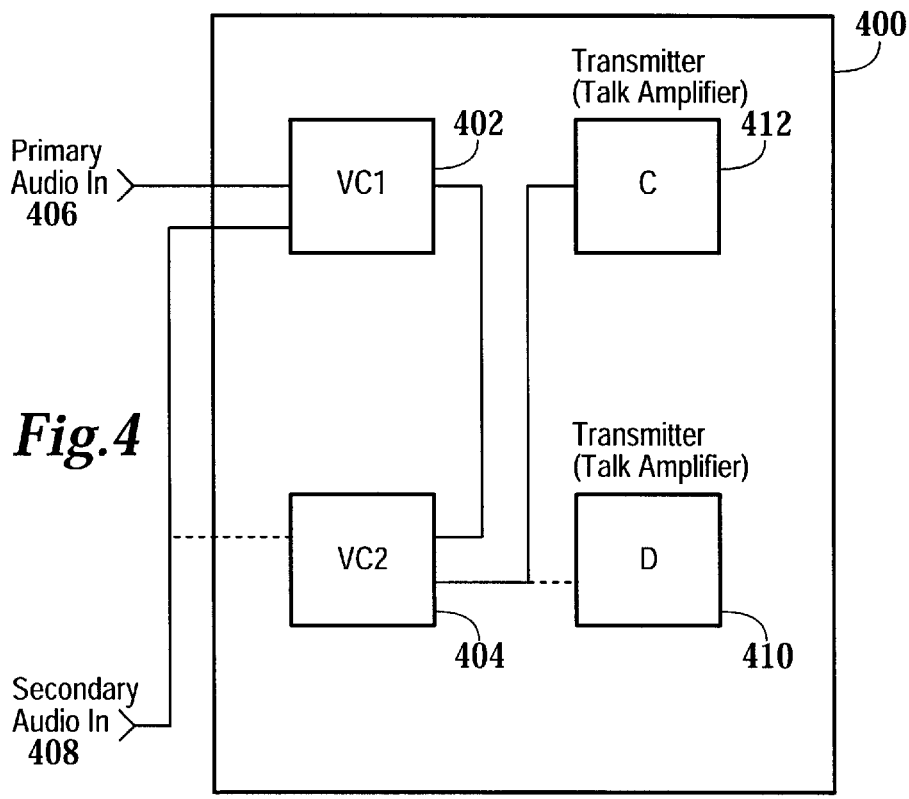
FIG. 4 depicts a block diagram of a mobile station in accordance with another embodiment of the present invention.

Reference is now made to FIG. 4, which shows a block diagram of a mobile station (MS) 400 in accordance another embodiment of the present invention. MS 400 comprises a first volume control (VC1) unit 402 and a second volume control (VC2) unit 404. A primary audio signal 406 and a secondary audio signal 408 may be input to VC1 402, and secondary audio signal 408 may optionally be input to VC2 404.

When the user of MS 400 is in receiving or listening mode (i.e., listening to signals via an earpiece of MS 400), primary audio signal 406 is the signal resulting from radio signals received by MS 400 from a remote base station system (not shown), following signal processing (e.g., demodulation, deciphering, de-interleaving, decoding and D/A conversion) as appropriate. The source of secondary audio signal 408 may be an external transducer or microphone, or the speaker of MS 400, or both.

VC1 402 may perform volume control function by performing selected filter gain on primary audio signal 406 based on secondary audio signal 408 and a database in a memory module in MS 400. This database may be created based upon the subscriber's initial manual adjustments to the volume in response to given levels of background noise. The gain of the desired signal and the gain of the undesired noise are adjusted according to the user's preferences.

VC2 404 may perform volume control by performing frequency adjustments to the filtered signal. VC2 404 may perform either a band reject function or a bandpass filter function. For example, normal speech mainly contains frequency components lower than approximately 3000 Hz. The frequency range of the voice of the particular user may be be learned and stored in the database in the memory module of MS 400, and VC2 404 may make adjustments accordingly. Furthermore, MS 400 may contain multiple SIM devices for storing the preferences of additional users. In listening mode, the filtered signal is then transmitted to receiver 410.

Filtering and volume control functions may likewise be accomplished when the user of MS 400 is talking (e.g., via a mouthpiece). Primary audio signal 406 comprises the user's speech and any ambient or background noise received by a microphone, typically in a mouthpiece of MS 400. Secondary audio signal 408 comprises audio input from an external transducer or microphone, or the speaker of MS 400 (typically in the earpiece of MS 400), or both.

VC1 402 may perform volume control function by performing selected filter gain on primary audio signal 406 based on secondary audio signal 408 and a database in a memory module in MS 400. The gain of the desired signal and the gain of the undesired noise are adjusted according to the user's preferences.

VC2 404 may perform volume control by performing frequency adjustments to the filtered signal. VC2 404 may perform either a band reject function or a bandpass filter function. In talking mode, the filtered signal is then transmitted to transmitter 412.

The present invention thus provides an automated system for adaptive volume control, operating within, and utilizing existing infrastructure of, a wired or a wireless telecommunications network.

What is claimed is:

1. An apparatus for automatically controlling a volume level of an audio signal transmitted to or received by a mobile station within a telecommunications network for one or more subscribers, the apparatus comprising:

a noise measuring device for measuring a noise external to communication with the mobile station;

a volume controller communicably coupled to the noise measuring device for adjusting the gain of the audio signal transmitted to or received by the mobile station based on a volume control data corresponding to the subscriber and the noise, and for updating the volume control data corresponding to the subscriber and the noise whenever the subscriber manually adjusts a volume level of the audio signal; and a memory module communicably coupled to the volume controller for storing the volume control data.

2. The apparatus of claim 1 wherein the memory module comprises a database of preferred levels of volume corresponding to noise data associated with the one or more subscribers.

3. The apparatus of claim 1 wherein the telecommunications network is a wireline telecommunications network.

4. The apparatus of claim 1 wherein the telecommunications network is a wireline telecommunications network.

5. The apparatus of claim 1 wherein the memory module is a SIM.

6. The apparatus of claim 1 wherein the volume controller filters the audio signal transmitted to or received by the mobile station.

7. An apparatus for automatically controlling a volume level of an audio signal transmitted to or received by a mobile station within a wireless telecommunications network for one or more subscribers, the apparatus comprising:

a noise measuring device for measuring a noise external to communication with the mobile station;

a volume controller communicably coupled to the noise measuring device for adjusting the gain of the audio signal transmitted to or received by the mobile station based on an input from a subscriber identity module, and for updating the volume control data corresponding to the subscriber and the measurement of the noise whenever the subscriber manually adjusts a volume level of the audio signal; and the subscriber identity module communicably coupled to the noise measuring device for identifying the subscriber and in communication with the volume controller for providing the input to the volume controller, wherein the input is based on the volume control data corresponding to the subscriber and the measurement of the noise.

8. The apparatus of claim 7 wherein the subscriber identity module comprises a database of preferred levels of volume corresponding to noise data associated with the one or more subscribers.

9. The apparatus of claim 7 wherein the volume controller adjusts the gain of the audio signal transmitted to or received by the mobile station.

10. The apparatus of claim 7 wherein the volume controller filters the audio signal transmitted to or received by the mobile station.

11. A method of automatically controlling a volume level of an audio signal transmitted to or received by a mobile station within a telecommunications network for one or more subscribers, comprising the steps of:

obtaining a measurement of a background noise signal;

obtaining a preferred volume level corresponding to the subscriber and the measurement of the background noise signal;

automatically adjusting the volume level of the audio signal to the preferred volume level; and updating the preferred volume level corresponding to the subscriber and the measurement of the background noise signal whenever the subscriber manually adjusts the volume level of the audio signal.

12. The method of claim 11 wherein the telecommunications network is a wireless telecommunications network.

13. The method of claim 11 wherein the telecommunications network is a wireline telecommunications network.

14. The method of claim 11 wherein the preferred volume level is stored in a database in a subscriber identity module.

15. The method of claim 11 further comprising the step of filtering the audio signal transmitted to or received by the mobile station.

16. A method of automatically controlling the volume level of an audio signal transmitted to or received by a mobile station within a telecommunications network for one or more subscribers, comprising the steps of:

receiving a first audio signal wherein the first audio signal comprises speech;

receiving a second audio signal wherein the second audio signal comprises background noise;

obtaining a preferred volume level corresponding to the subscriber and the level of the second audio signal;

obtaining a third audio signal by filtering the first audio signal;

automatically adjusting the volume level of the third audio signal to the preferred volume level; and updating the preferred volume level corresponding to the subscriber and the level of the second audio signal whenever the subscriber manually adjusts the volume level of the third audio signal.

17. The method of claim 16 wherein the telecommunications network is a wireless telecommunications network.

18. The method of claim 16 wherein the telecommunications network is a wireline telecommunications network.

19. The method of claim 16 wherein the preferred volume level is stored in a database in a subscriber identity module.

* * * * *